United States Patent [19]
Niwa et al.

[11] Patent Number: 6,052,227
[45] Date of Patent: *Apr. 18, 2000

[54] SCREEN ASSEMBLY WITH PIVOTING LEG MEMBERS

[75] Inventors: Masatoshi Niwa; Hajime Maruta, both of Joetsu; Tomoshi Oozeki, Tokyo, all of Japan

[73] Assignee: Arisawa Mfg. Co., Ltd., Niigata-ken, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/093,680

[22] Filed: Jun. 9, 1998

[30] Foreign Application Priority Data

Jun. 13, 1997 [JP] Japan ..................................... 9-157076

[51] Int. Cl.[7] ............................. G03B 21/56; G03B 21/58
[52] U.S. Cl. ........................................................... 359/461
[58] Field of Search ................................... 359/461, 443; 248/444.1, 464, 463; 206/169, 195, 180

[56] References Cited

U.S. PATENT DOCUMENTS

| 4,017,152 | 4/1977 | Allen | 350/117 |
|---|---|---|---|
| 4,050,658 | 9/1977 | Forman et al. | 248/13 |
| 4,110,003 | 8/1978 | Zinn | 350/117 |
| 4,169,658 | 10/1979 | Brown | 350/118 |
| 4,705,355 | 11/1987 | Espo | 350/117 |
| 5,581,401 | 12/1996 | Takamoto et al. | 359/443 |
| 5,706,130 | 1/1998 | Rosen | 359/443 |
| 5,791,624 | 8/1998 | Fedrick | 248/460 |
| 5,798,861 | 8/1998 | Doat | 359/461 |

FOREIGN PATENT DOCUMENTS

| 8-29878 | 2/1996 | Japan | G03B 21/58 |
|---|---|---|---|
| 8-62727 | 3/1996 | Japan | G03B 21/62 |
| 8-69057 | 3/1996 | Japan | G03B 21/58 |

*Primary Examiner*—Howard B. Blankenship
*Assistant Examiner*—Christopher Mahoney
*Attorney, Agent, or Firm*—Sughrue, Mion, Zinn, Macpeak & Seas, PLLC

[57] ABSTRACT

A practically excellent screen assembly in which a screen may be located at a high level position without any discrete assistance, and leg members provided therefor may be well received in a non-use condition. The screen assembly is characterized in that a screen winding receiver for winding and receiving a screen member, having a flexibility, is provided within a case member having a grip portion. A pair of screen support members for supporting the screen member when the screen member is drawn upwardly are pivoted on right and left sides of the case member. On the other hand, leg members extending downwardly are pivoted on the right and left sides of the case member, and the screen support members and the leg members are formed to have a length so as riot to project from the ends of the case member when the screen support members and the leg members are angularly moved to be attached to the case member.

13 Claims, 7 Drawing Sheets

SCREEN ASSEMBLY WITH PIVOTING LEG MEMBERS

BACKGROUND OF THE INVENTION

The present invention relates to a portable or movable screen assembly.

Recently, a portable screen which may be carried has been used in practice as disclosed in Japanese Patent Application Laid-Open No. Hei 8-29878.

However, in the conventional portable screen assembly, there are no leg members. In the case where the screen is located and used at a high level position, the screen assembly must be laid on a base such as a table.

Accordingly, although the screen assembly is made into one piece so as to be portable or movable as desired, the transportation and the movement of the base would be troublesome. As a result, the portability or the movability of the portable screen assembly would not be well exhibited.

SUMMARY OF THE INVENTION

In order to overcome the above-noted shortcomings, an object of the present invention is to provide a practically excellent screen assembly in which a screen may be located at a high level position without any discrete assistance, and leg members provided therefor may be well received in non-use condition.

According to the present invention, there is provided a screen assembly wherein a screen winding receiver portion for winding and receiving a screen member having a flexibility is provided within a case member having a grip portion. A pair of screen support members for supporting the screen when the screen member is drawn upwardly are pivoted on right and left sides of the case member. On the other hand, the leg members extending downwardly are pivoted on right and left sides of the case member. The screen support members and the leg members are formed to have a length so as not to project from end portions of the case member when the screen support members and the leg members are angularly moved to be attached to the case member. Therefore, the screen support members and the leg members may be received in the case member.

Leg member support members are provided for respectively supporting and maintaining the leg members extending downwardly in a suspended condition. A first end of each leg member support member is pivoted on the case member in the vicinity of a pivot portion of the corresponding leg member. A second end of each leg member support member is retained at the corresponding leg member.

A reinforcement rod member is provided at an upper end of each screen member. A screen retaining portion for being retained at each screen support member is provided at both ends of the reinforcement rod member.

A small diameter portion is provided at both ends of the reinforcement rod member so that both ends of the reinforcement rod member are formed into screen retainer portions. An inverted U-shaped receiver portion on which the screen retainer portion is laid is provided at a tip end of each screen support member. Further, a fit portion fitted to the small diameter portion laid on the receiver portion is provided to retain the small diameter portion in a pull-apart prevented condition.

A flat ground contact portion is provided on a bottom portion of the case member. The flat ground contact portion is provided as a discrete member from the case member.

Each screen support member is provided to be extendable or retractable. A retainer mechanism for retaining an extension/retraction condition of each screen support member is provided to the screen support member.

It is a further object of the invention to provide a screen assembly wherein a screen winding receiver portion for winding and receiving a screen member having a flexibility is provided within a case member having a grip portion. A pair of screen support members for supporting the screen member when the screen member is drawn upwardly are pivoted on right and left sides of the case member. A pair of leg members extending downwardly are pivoted on right and left sides of the case member. The screen support members and the leg members are formed to have a length so as not to project from end portions of the case member when the screen support members and the leg members are angularly moved to be attached to the case member. On the other hand, a reinforcement rod member is provided at an upper end of each screen member. A small diameter portion is provided at both ends of the reinforcement rod member so that both ends of the reinforcement rod member are formed into a screen retainer portion. An inverted U-shaped receiver portion on which the screen retainer portion is laid is provided at a tip end of each screen support member. A fit portion fitted to the screen retainer portion laid on the screen retainer portion is provided to retain the small diameter portion in a pull-apart prevented condition. Each screen support member is provided to be extendable or retractable. A retainer mechanism for retaining an extension/retraction condition of each screen support member is provided to the screen support member. Furthermore, leg member support members are respectively provided for supporting and maintaining the leg members extending downwardly in a suspended condition. A first end of each leg member support member is pivoted on the case member in the vicinity of a pivot portion of the corresponding leg member. The second end of each leg member support member is retained at the corresponding leg member. The leg member support members, the leg members and the screen support members may be formed to be received within the case member. Furthermore, a flat ground contact portion is detachably provided on a bottom portion of the case member, and the flat ground contact portion is provided to be received within the case member.

When the screen assembly is stored or carried, the screen member is wound and received in the screen winding receiver portion within the case member, and the screen support members and the leg members are pivoted to be attached to the case member.

When the screen assembly is in use, the grip portion is gripped to be moved and installed at a desired position, the leg members pivoted at the case member are angularly moved downwardly. The case member is supported and retained by the leg members. Subsequently, the screen support members are angularly moved upwardly so that the screen member drawn upwardly from the case member is supported to the screen support members.

With such an arrangement, according to the present invention, it is possible to provide a compact screen assembly which is superior in practical use and in portability in which the screen may be located at a high level position without using any other discrete member.

DETAILED DESCRIPTION OF THE PREFERRED EMBODIMENTS

One embodiment of the present invention will now be described with reference to the accompanying drawings.

Figure 1:
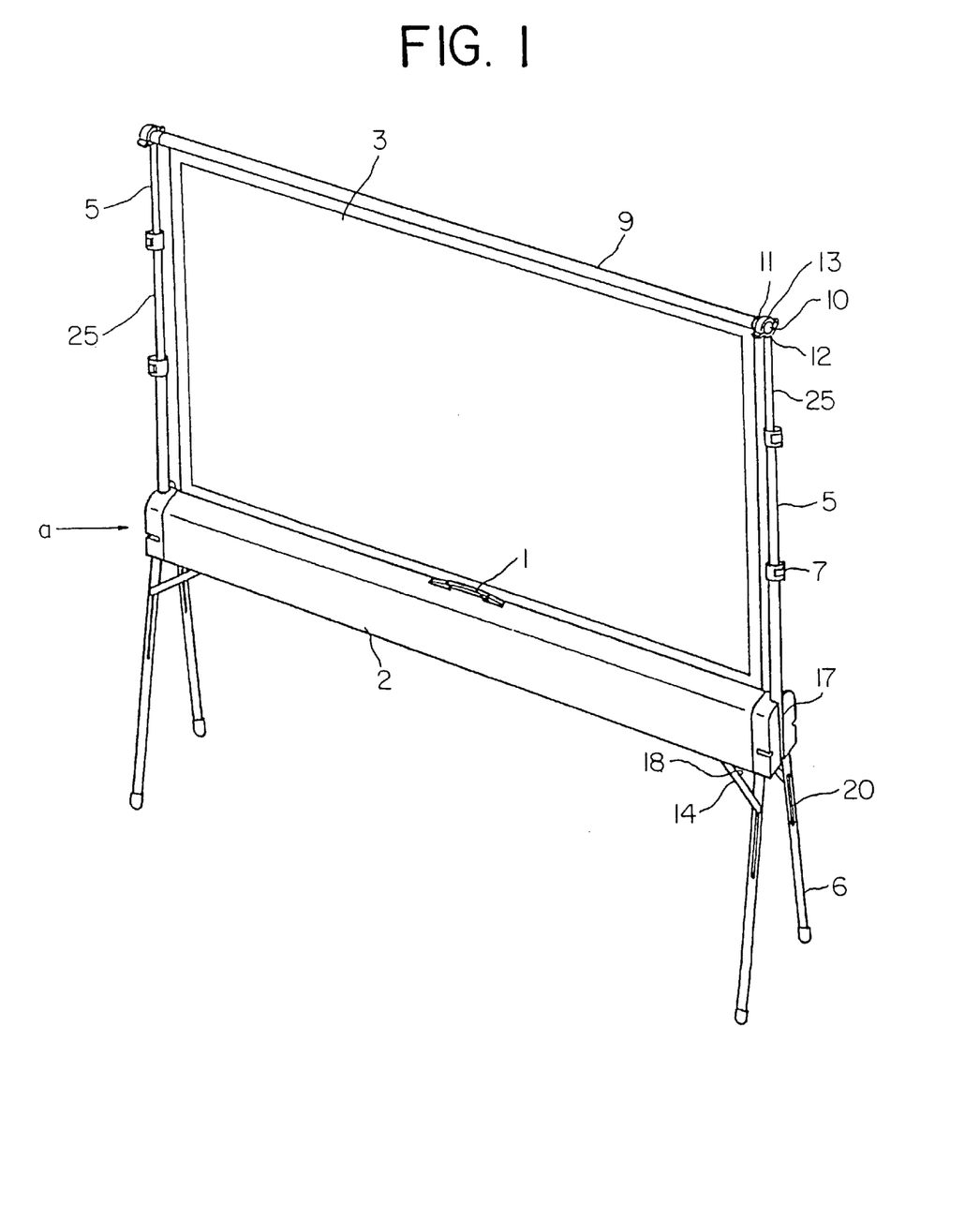
FIG. 1 is a perspective view showing a condition in use of a screen assembly according to an embodiment of the invention.
Figure 2:
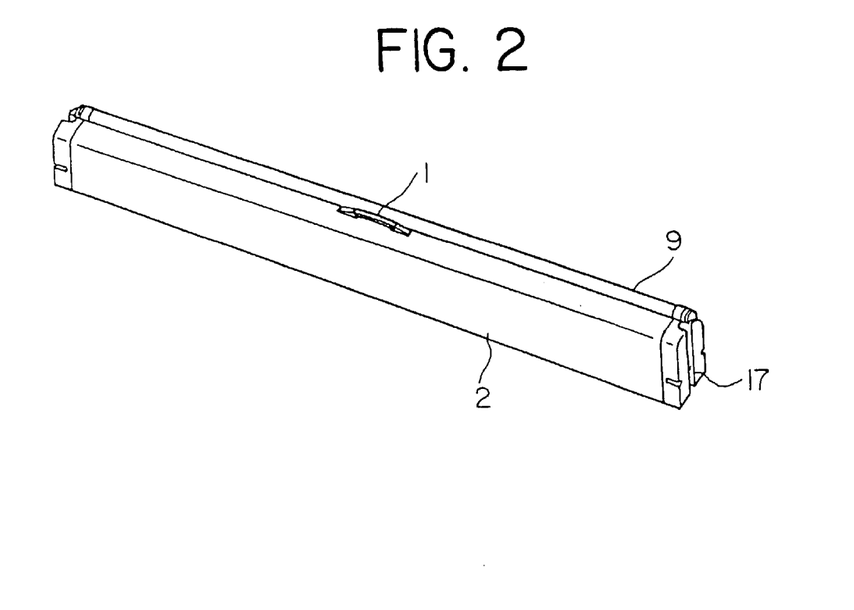
FIG. 2 is a perspective view showing a received condition of the screen assembly according to the embodiment of the invention.
Figure 3:
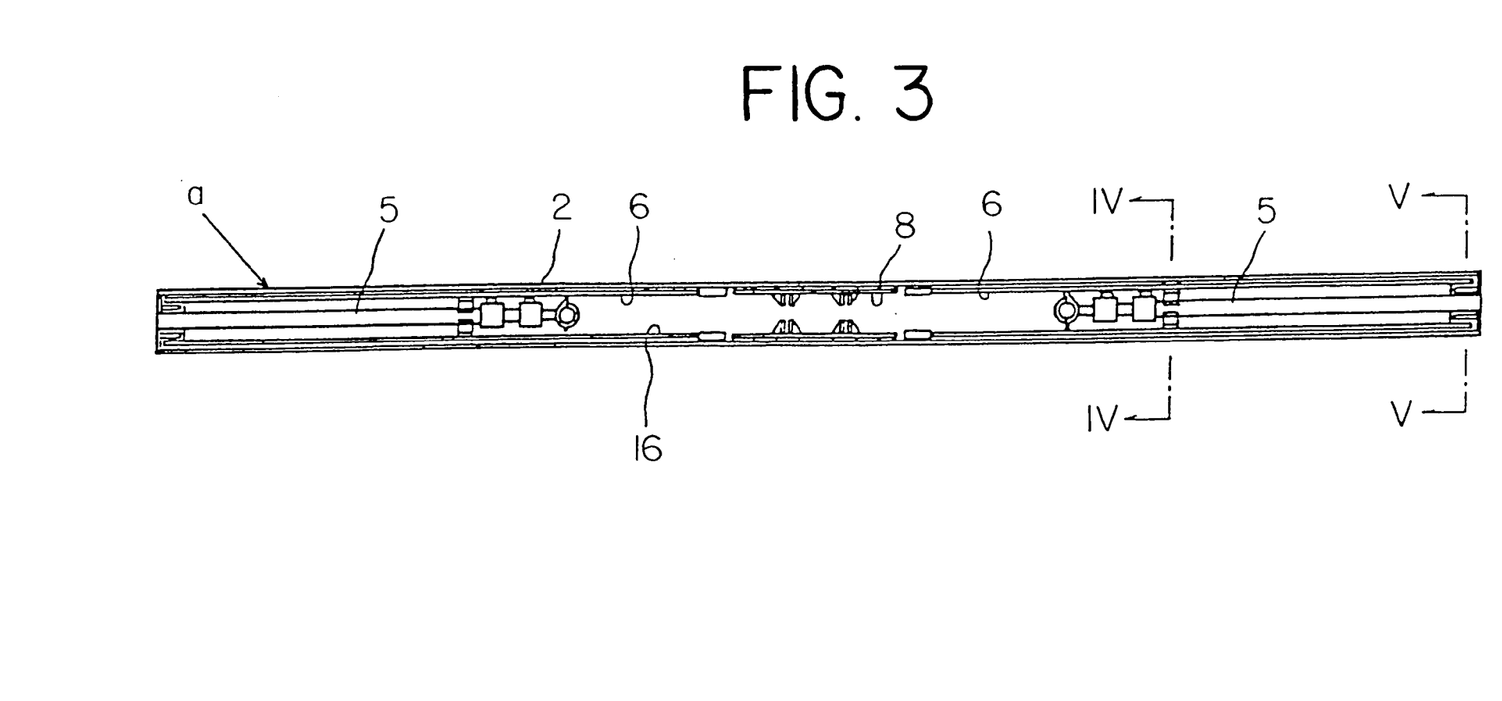
FIG. 3 is a bottom view showing the received condition of the screen assembly according to the embodiment of the invention.

As shown in FIG. 1, in a reflex type screen assembly a which reflects a projection beam emitted from a projecting device such as a projector according to the embodiment, a screen winding receiver portion 4 (see FIG. 4) for winding and receiving a screen member 3 that has a flexibility is provided within a case member 2 having a grip portion 1. A pair of screen support members 5 each of which supports the screen member 3 when the screen support members 5 are drawn upwardly are pivoted on the right and left sides of the case member 2. On the other hand, leg members 6 extending downwardly on the right and left sides of the case member 2 are pivoted. A length of the screen support members 5 and the leg members 6 is set so as not to project from each end portion of the case member 2 when the screen support members 5 and the leg members 6 are pivotally moved and received in the case member 2.

Figure 4:
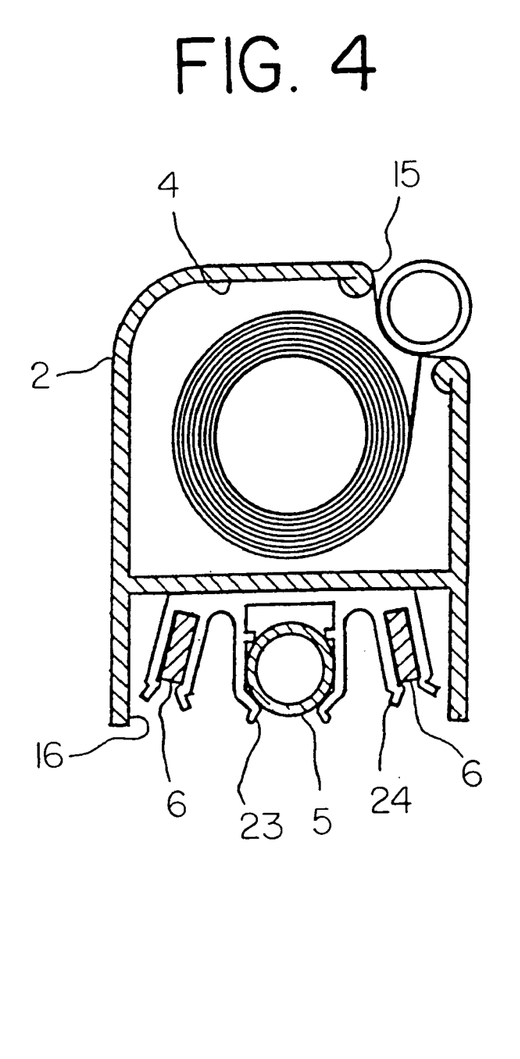
FIG. 4 is a cross-sectional view taken along the line IV—IV of FIG. 3.
Figure 5:
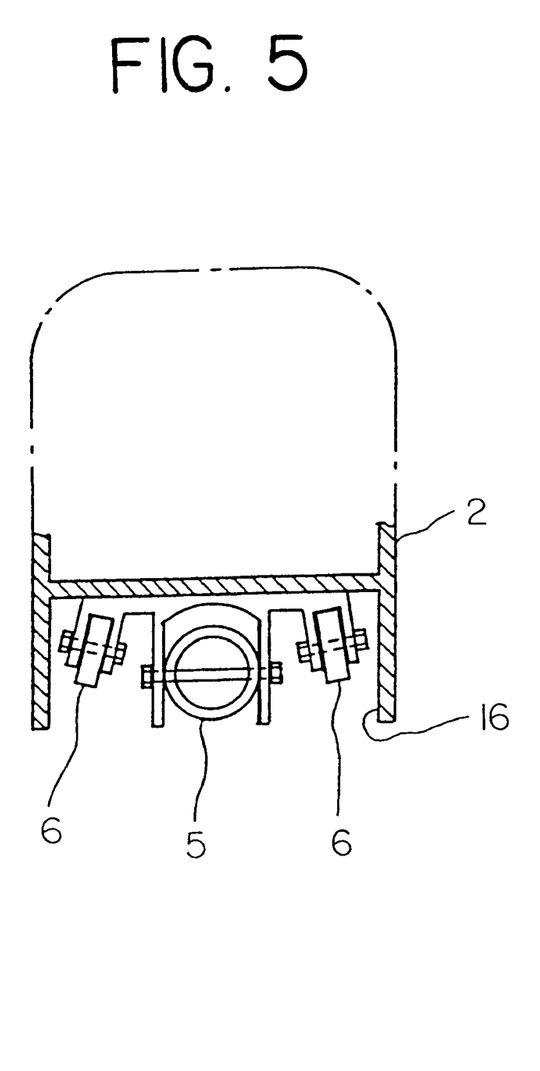
FIG. 5 is a cross-sectional view taken along the line V—V of FIG. 3.

As shown in FIG. 4, a drawing and opening portion 15 for drawing out and receiving the screen member 3 is provided at an upper portion of the case member 2. A screen winding and receiving portion 4 is formed within the drawing and opening portion 15.

A receiver recess portion 16 for fitting and receiving the screen support members 5 and the leg members 6 when the screen support members 5 and the leg members 6 are pivoted downwardly and, received in the case member 2 is formed in a lower portion of the case member 2. Also, attachment/detachment retainer portions 23 and 24 for detachably retaining the received screen support members 5 and leg members 6 are provided in the receiver recess portion 16.

A flat surface is formed on a lower surface of the case member 2 so that the case member 2 is not swung or displaced when the case member 2 is laid on a floor or the like.

As shown in FIG. 1, a reinforcement rod member 9 is provided at an upper edge of the screen member 3 for preventing the screen member 3 from being deformed on the right and left sides.

A small diameter portion 11 is formed on each of the right and left ends of the reinforcement rod member 9. The end portion from the small diameter portion 11 of the reinforcement member 9 is provided at a screen retainer portion 10.

As shown in FIGS. 1 and 4, the screen member 3 is wound or received in the screen winding and receiving portion 4 within the case member 2 when the screen assembly a is stored or carried. In this storage condition, the reinforcement rod member 9 of the screen member 3 is retained under a laid condition in the drawing and opening portion 15.

Figure 7:
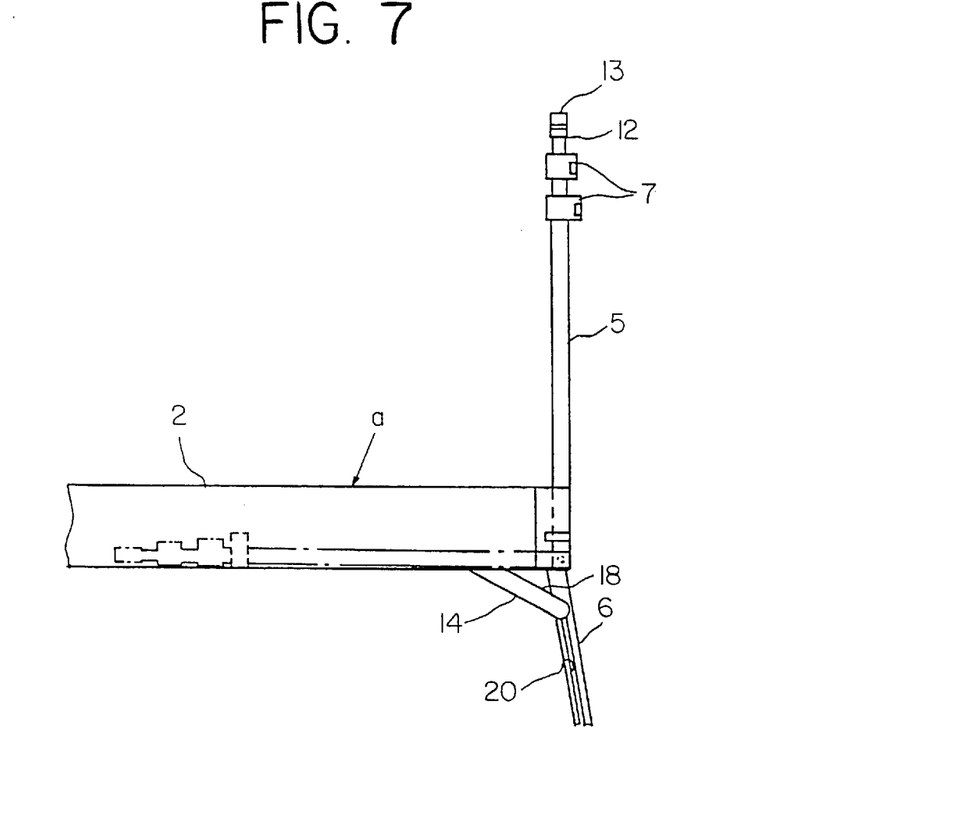
FIG. 7 is another enlarged side elevational view of the screen assembly according to the embodiment of the invention.
Figure 9:
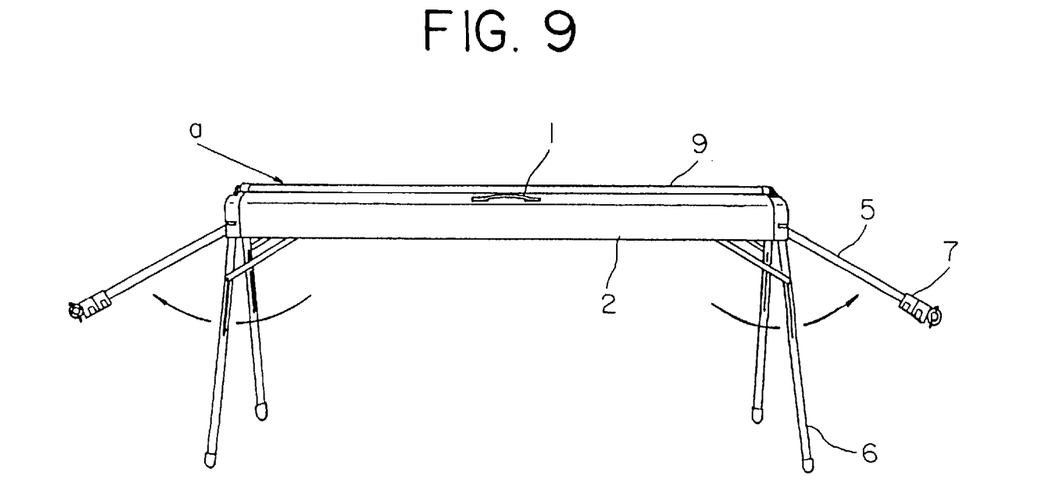
FIG. 9 is a side elevational perspective view showing the pivot operation of the screen support members according to the embodiment of the invention.

As shown in FIGS. 1 and 7, and 9, the each screen support members 5 are pivoted on the right and left lower portions of the case member 2. When the screen support members 5 are received in the receiver recess portion 16, and then pivoted through about 270° upwardly and kept in an upright condition from the case member 2, the screen member 3 is retained by the screen support members 5. Incidentally, in the embodiment, a support member fitting portion 17 into which the screen support members 5 pivoted upwardly is fitted and retained is provided on each of the right and left sides of the case member 2, and the upright screen support members 5 are supported at the support member fitting portions 17. Accordingly, the screen support members 5 is prevented from falling down.

As shown in FIGS. 1 and 7, each screen support member 5 is composed of a plurality of hollow rod members 25 slidably connected to each other so that when the hollow rod members 25 are slidably moved, the screen support member 5 is extended or retracted. Also, retainer mechanisms 7 are provided to the screen support member 5 for securely fixing the hollow rod members 25 to each other so that a length of each screen support member 5 may be maintained at a desired length by the retainer mechanisms 7.

As shown in FIG. 1, an inverted U-shaped receiver portion 12 on which each screen retainer portion 10 of the screen member 3 is laid is provided at the end of each screen support member 5. A fit portion 13 fitted with the screen retainer portion 10 laid on the receiver portion 12 for retaining the screen retainer portion 10 in a pull-apart prevented condition is pivoted at one end of the receiver portion 12. The screen retainer portion 10 of the screen member 3 laid on the receiver portion 12 of the screen support member 5 is prevented from being displaced on the right and left sides with the small diameter portion 11 of the reinforcement rod member 9 being retained at a side edge of the receiver portion 12. Also, the screen retainer portion 10 is prevented also from moving up and down by the receiver portion 12 and the fit portion 13.

Figure 6:
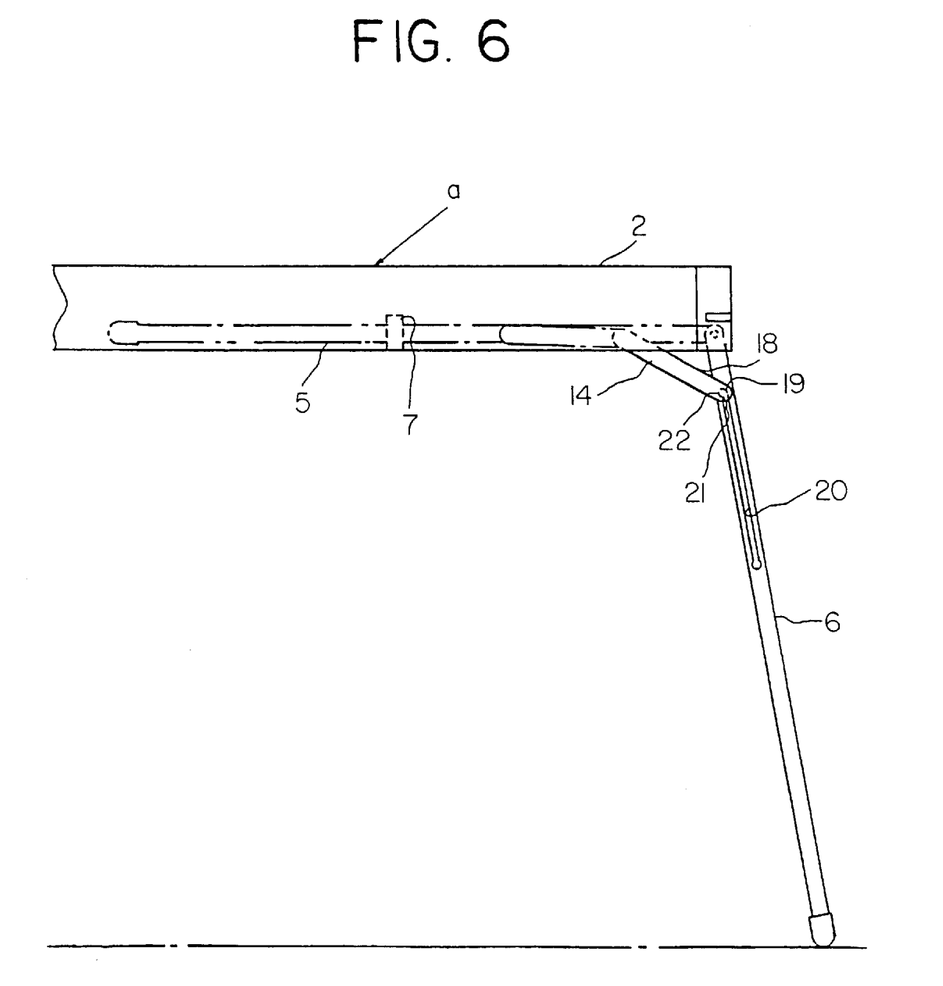
FIG. 6 is an enlarged side elevational view of the screen assembly according to the embodiment of the invention.

As shown in FIG. 6, the leg members 6 are pivoted on the right and left lower portions of the case member 2 and are provided so as to support and retain the case member 2 when the leg members 6 received in the receiver recess portion 16 is pivoted through about 90° downwardly.

Also, in order to further ensure the retainment of the case member 2 by the leg members 6, a leg member support member 14 is pivoted in the vicinity of a pivot portion of each lower leg member 6 of the case member 2. A tip end of the leg member support member 14 is provided to be retainable at the leg member 6 that has been pivoted through about 90° downwardly. A triangle structure of the case member 2, the leg member 6 and the leg member support member 14 is used as a pivot preventing mechanism 18 to prevent the leg member support member 14 from pivoting.

Figure 8:
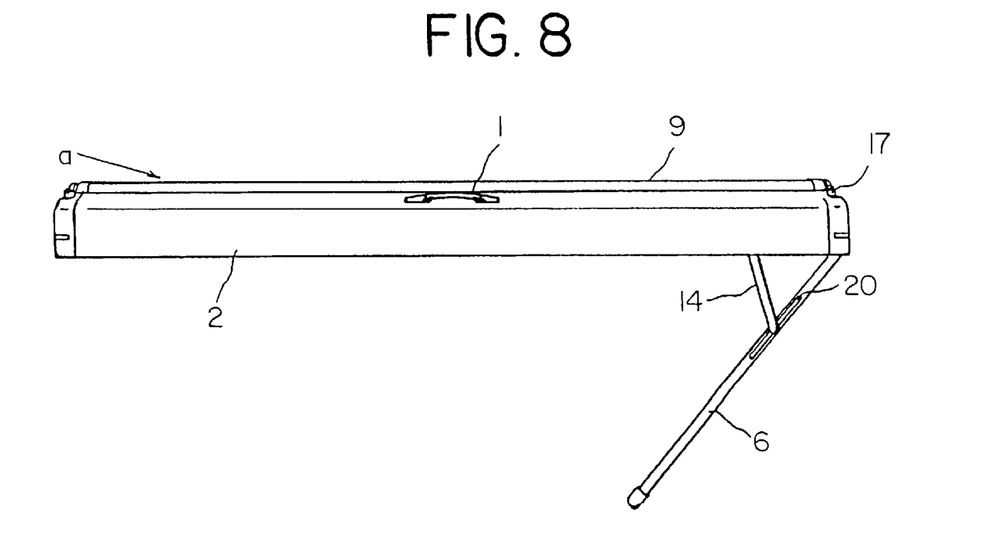
FIG. 8 is a side elevational view showing a pivot operation of the leg member according to the embodiment of the invention.

Incidentally, in the embodiment, a projection 19 is formed at the tip end of the leg support member 14. On the other hand, a groove portion 20 which is engaged with the projection 19 to be slidable is formed in the leg member 6. A groove retainer portion 22 in which the projection 19 of the leg member 6 is retained and passed through a ride-over portion 21 provided in the vicinity of the tip end of the groove portion 20 when the leg member 6 is moved through about 90° downwardly is formed at the tip end of the groove portion 20. Accordingly, when the leg member 6 is pivoted downwardly, the projection 19 of the leg member support member 14 is slidably moved along the groove portion 20 of the leg member 6 and when the leg member 6 is pivoted until the case member 2 is supported and retained, the projection 19 of the leg member support member 14 rides over the ride-over portion 21 of the groove portion 20 so that the projection 19 is retained to the groove retainer portion 22. As a result, the leg member 6 and the leg member support member 14 are prevented from pivoting to each other. The case member 2 may be supported and retained without fail by the leg member 6. Also, when the projection 19 of the leg member support member 14 is moved on the side of the groove portion 20 while riding over the ride-over portion 21 of the groove portion 20, the leg member 6 may be pivoted again. Incidentally, it is possible to ensure the same effect in the case where the leg member support member 14 is pivoted to the leg member 6 and the tip end of the leg member support member 14 is retained to the case member 2.

Figure 10:
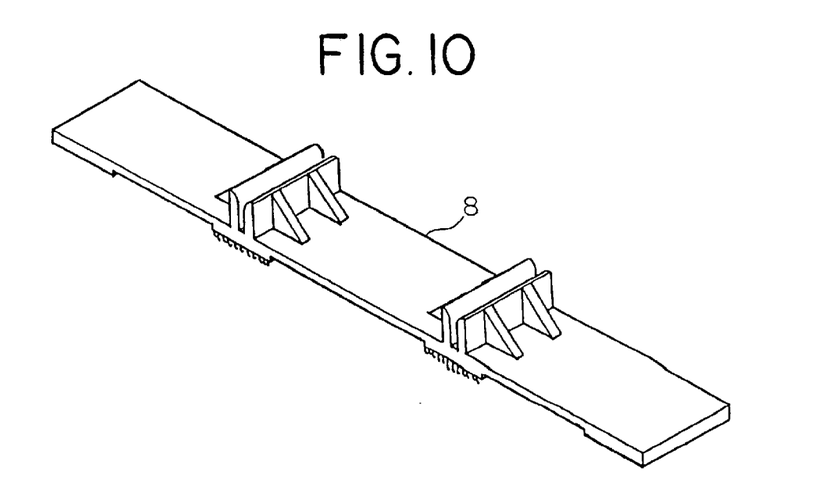
FIG. 10 is a perspective view showing a flat ground contact portion according to the embodiment of the invention.

As shown in FIG. 10, a flat ground contact portion 8 which is detachable from the receiver recess portion 16 (see FIG. 4) is received in the receiver recess portion 16 of the case member 2.

Figure 11:
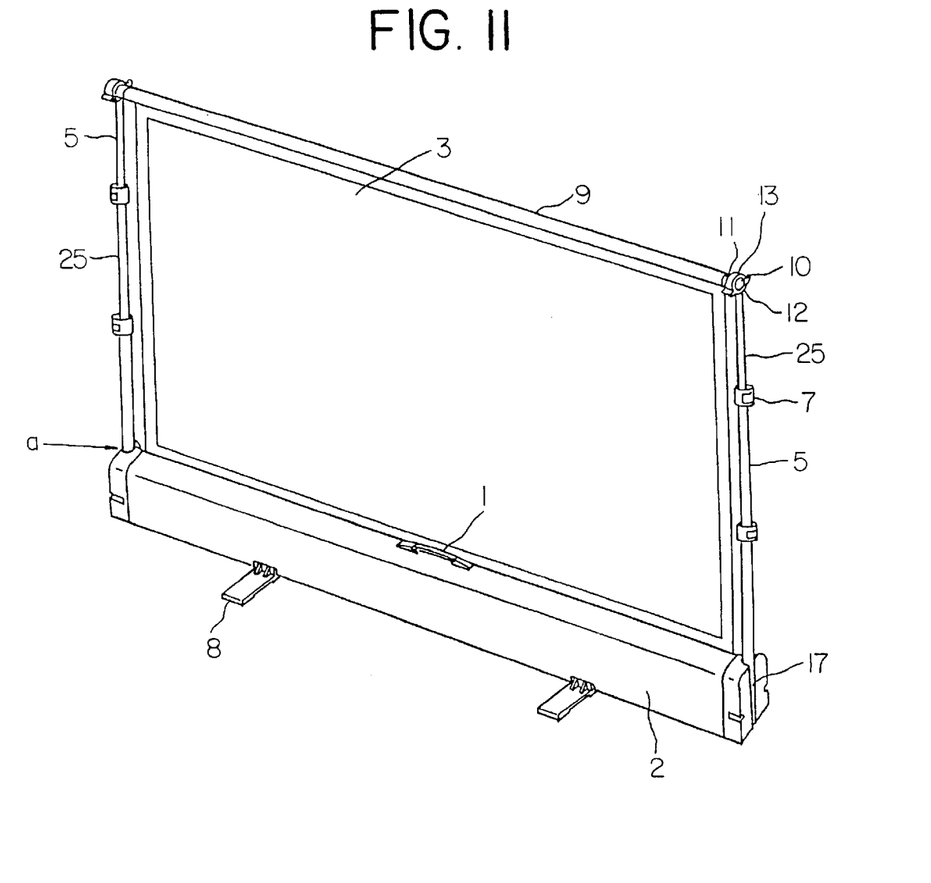
FIG. 11 is a perspective view showing another state in use according to the embodiment of the invention.

In FIG. 11, the flat ground contact portion 8 is always received in the receiver recess portion 16; however, in the case where the leg members 6 cannot be used (in the case where a base on which the screen is laid is fixed to the front face of the projector and so on), the flat ground contact portion 8 is mounted on a bottom portion of the case member 2 so that the overturn of the screen assembly a which has a center of gravity at a higher level resulting from the draw-out of the screen member 3 may be prevented.

With such an arrangement according to the embodiment, it is possible to provide a screen assembly that is superior in receivability, portability and transportation property and that may be stored or carried under the compact condition that the screen member 3, the screen support members 5, the leg members 6 and the like are not projected from the case member 2.

Also, since the leg members 6 for supporting and retaining the case member 2 are provided to the case member 2, even if the screen member 3 is located at a higher level position, it is unnecessary to prepare a stand for locating the screen member at the high level position as in the conventional type assembly which is of a type in which the screen member is hooked at a tip end of the stand such as a tripod, or a table on which the screen member is laid. This contributes to the excellent practical use in comparison with the conventional screen assembly.

Also, as shown in FIG. 6, when the leg members 6 are pivotally rotated through about 90° downwardly to support and retain the case member 2 by the leg members 6, the leg members 6 may readily be securely fixed without failure by the leg member support members 14 and the pivot preventing mechanisms 18. It is therefore possible to provide a screen assembly a which is superior in practical use and stability, and which may be laid on the floor in a stable condition supported by the leg members 6.

Also, as shown in FIG. 1 the screen member 3 may readily be drawn out by lifting up the reinforcement rod member 9 of the screen member 3 from the drawing and opening portion 15 (see FIG. 4) of the case member 2. In addition, the drawn screen retainer portion 10 of the screen member 3 may readily be retained without fail at the receiver portion 12 and fit portion 13 of each screen support member 5. It is therefore possible to provide a screen assembly that is superior in practical use and workability, in which the screen member 3 may readily be located at a predetermined position.

Also, since the screen support member 5 is telescopic and its length may be maintained by the retainer mechanisms 7, when the large size screen member 3 is installed, after the screen retainer portion 10 has been retained at the receiver portion 12 and the fit portion 13 of each screen support member 5, the screen support member 5 is extended so that the screen member 3 may readily be installed at a height at which the person could not reach his or her hands while carrying out the work of the screen member 3 within his or her reach.

Also, as shown in FIG. 4, since the screen winding receiver portion 4 for winding and receiving the screen member 3 (see FIG. 1) is provided in the upper portion of the case member 2, and the receiver recess portion 16 for receiving the screen support members 5, the leg members 6 and the like is provided in the lower portion of the case member 2, the case member 2 takes an upper and lower two-stage structure to make the width thereof smaller. Accordingly, it is possible to save the space for storage of the screen assembly a. In addition, it is possible to provide a screen assembly which may readily be carried and superior in storage property and portability.

Also, as shown in FIGS. 1 and 11, since the flat ground contact portion 8 is provided as a discrete member on the bottom portion of the case member 2, it is possible to prevent the screen assembly a from turning over by the flat ground contact portion 8 in the case where the leg members 6 cannot be used. In the case where the leg members 6 are used, it is possible to provide the screen assembly in which the flat ground contact portion 8 may be received in the receiver recess portion 16 so as not to hinder the pivot motion of the leg members 6 and the screen support members 5 and which is superior in practical use and workability.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. A screen assembly comprising:

a case member having a grip portion;

a screen member, a screen winding receiver portion, for winding and receiving the screen member having a flexibility, disposed within the case member;

a pair of screen support members for supporting the screen member when the screen member is drawn upwardly, the screen support members being pivoted on right and left sides of the case member; and a plurality of leg members, the leg members extending downwardly away from the case member, the case member being in a substantially level position while the leg members swingably move in an up and down direction and pivot on the right and left sides of the case member, and the screen support members and the leg members being formed to have a length so as not to project from end portions of the case member when the screen support members and the leg members are swiveled around a pivotal portion to be attached to the case member.

2. The screen assembly according to claim 1, wherein the screen support members and the leg members may be received in the case member.

3. The screen assembly according to claim 2, further comprising a plurality of leg member support members for respectively supporting and maintaining the leg members extending downwardly in a suspended condition, each of the leg member support members having a first end and a second end, wherein the first end is pivoted on the case member in the vicinity of a pivot portion of a corresponding one of the leg members, and the second end thereof is retained at the corresponding one of the leg members.

4. The screen assembly according to claim 1, further comprising a plurality of leg member support members for respectively supporting and maintaining the leg members extending downwardly in a suspended condition, each of the leg member support members having a first end and a second end, wherein the first end is pivoted on the case member in the vicinity of a pivot portion of a corresponding one of the leg members, and the second end thereof is retained at the corresponding one of the leg members.

5. The screen assembly according to any one of claims 1 to 4, further comprising a reinforcement rod member disposed at an upper end of each screen member, and a screen retaining portion for being retained at each screen support member disposed at both ends of the reinforcement rod member.

6. The screen assembly according to claim 5, further comprising a rod member end portion disposed at both ends of the reinforcement rod member so that both ends of the reinforcement rod member are formed into the screen retainer portions, an inverted U-shaped receiver portion on which the screen retainer portion is laid, disposed at a tip end of each screen support member, and a fit portion fitted to the rod member end portion laid on the receiver portion to retain the rod member end portion in a pull-apart prevented condition.

7. The screen assembly according to claim 6, further comprising a flat ground contact portion disposed on a bottom portion of the case member, and the flat ground contact portion being a discrete member from the case member.

8. The screen assembly according to claim 6, wherein each screen support member is operative to extend and retract, and a retainer mechanism for retaining an extension/retraction condition of each screen support member is provided to the screen support member.

9. The screen assembly according to any one of claims 1 to 4, further comprising a flat ground contact portion disposed on a bottom portion of the case member, and the flat ground contact portion being as a discrete member from the case member.

10. The screen assembly according to any one of claims 1 to 4, wherein each screen support member is operative to extend and retract, and a retainer mechanism for retaining an extension/retraction condition of each screen support member is provided to the screen support member.

11. The screen assembly according to claim 10, further comprising a flat ground contact portion disposed on a bottom portion of the case member, and the flat ground contact portion being a discrete member from the case member.

12. A screen assembly comprising:

a case member having a grip portion;

a screen member;

a screen winding receiving portion, for winding and receiving the screen member having a flexibility, disposed within the case member;

a pair of screen support members, for supporting the screen member when the screen member is drawn upwardly, are pivoted on right and left sides of the case member;

a plurality of leg members, the leg members extending downwardly away from said case member, the case member being in a substantially level position while the leg members swingably move in an up and down direction and pivot on the right and left sides of the case member, the screen support members and the leg members being formed to have a length so as not to project from end portions of the case member when the screen support members and the leg members are swiveled around a pivotal portion to be attached to the case member;

a reinforcement rod member disposed at an upper end of the screen member, a rod member end portion disposed at both ends of the reinforcement rod member so that both ends of the reinforcement rod member are formed into a screen retainer portion;

an inverted U-shaped receiver portion on which the screen retainer portion is laid at a tip end of each screen support member;

a fit portion fitted to the screen retainer portion laid on the receiver portion to retain the rod member end portion in a pull-apart prevented condition;

each screen support member being operative to extend and retract;

a retainer mechanism for retaining an extension/retraction condition of each screen support member being provided to the screen support member;

a plurality of leg member support members for respectively supporting and maintaining the leg members extending downwardly in a suspended condition, each of said leg member support members having a first end and a second end, wherein said first end is pivoted on the case member in the vicinity of a pivot portion of a corresponding one of the leg members, and the second end thereof is retained at the corresponding one of the leg members;

the leg member support members, the leg members and the screen support members being formed to be received within the case member; and a flat ground contact portion detachably provided on a bottom portion of the case member, and the flat ground contact portion being operative to be received within the case member.

13. A screen assembly comprising:

a case member having a grip portion;

a screen member;

a screen winding receiver portion, for winding and receiving the screen member having a flexibility, disposed within the case member;

a pair of screen support members for supporting the screen member when the screen member is drawn upwardly, the screen support members being pivoted on right and left sides of the case member; and a plurality of leg members, the leg members extending downwardly away from the case member, the case member being in a substantially level position while the leg members swingably move in an up and down direction and pivot on right and left sides of the case member, wherein the screen member is operative to be wound and received within a first surface of the case member, and the screen support members and the leg members are angularly moved to be attached to a second surface of the case member which is opposite to the first surface thereof.

* * * * *

UNITED STATES PATENT AND TRADEMARK OFFICE
CERTIFICATE OF CORRECTION

PATENT NO.: 6,052,227
DATED: April 18, 2000
INVENTOR(S): Masatoshi NIWA, Hajime MARUTA, Tomoshi OOZEKI It is certified that error(s) appears in the above-identified patent and that said Letters Patent is hereby corrected as shown below:

IN THE ABSTRACT:

Third line from the bottom, change "riot" to --not--.

IN THE SPECIFICATION:

Column 2, line 23, change "retainer" (second occurrence) to --receiver--.

Column 3, line 31, after "assembly" change "a" to --a--.

Column 4, line 11, delete "each".

IN THE CLAIMS:

Claim 9, line 4, delete "as".

Signed and Sealed this

Seventeenth Day of April, 2001

NICHOLAS P. GODICI

*Attest:*

*Attesting Officer*   Acting Director of the United States Patent and Trademark Office